Figure 1:
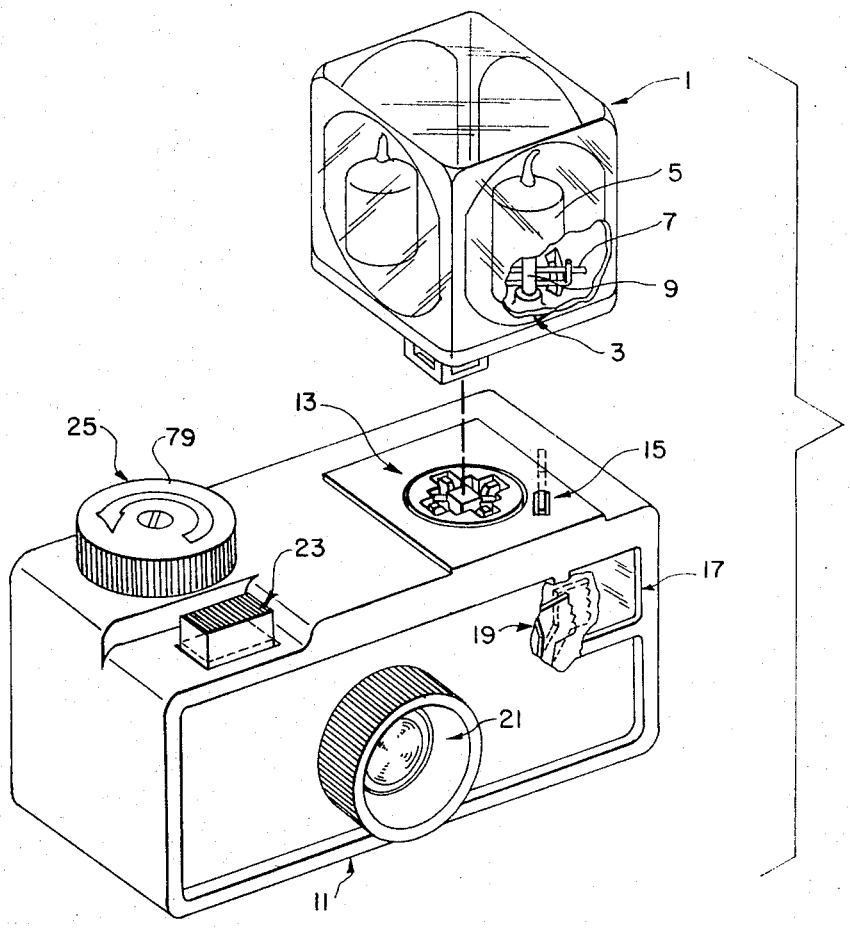
Figure 3:
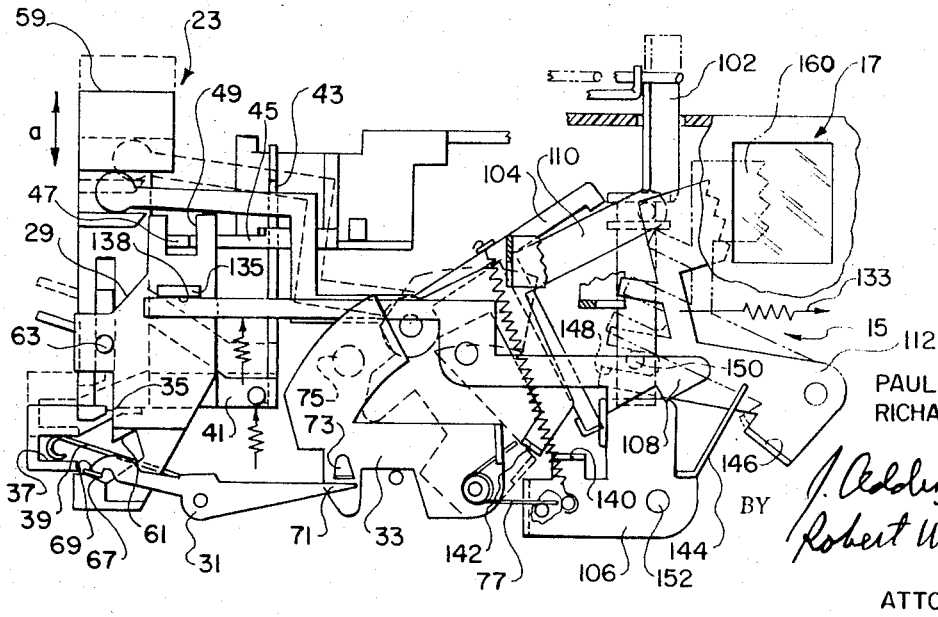
Figure 2:
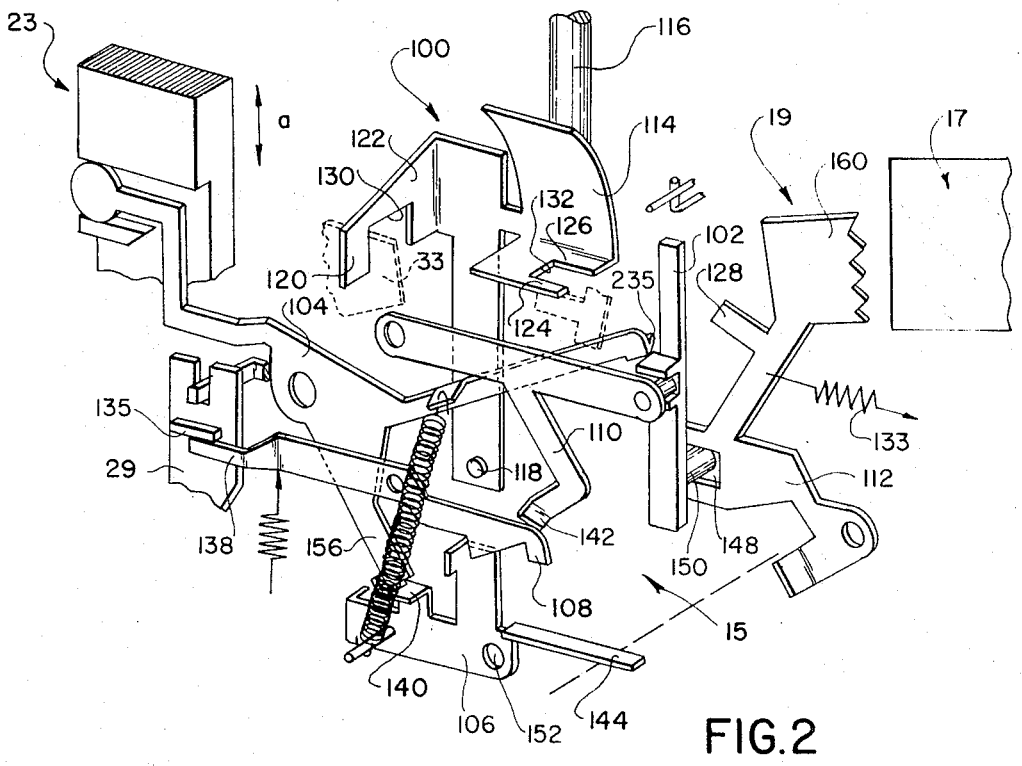
Figure 6:
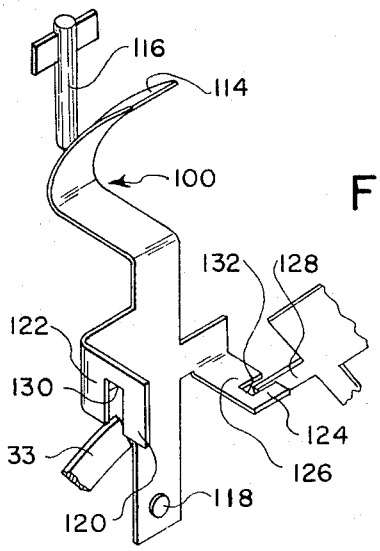
Figure 4:
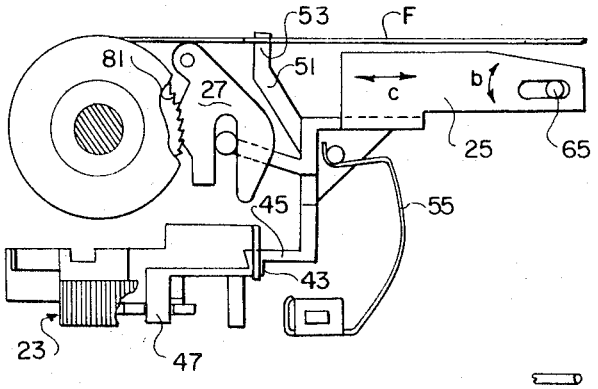
Figure 7:
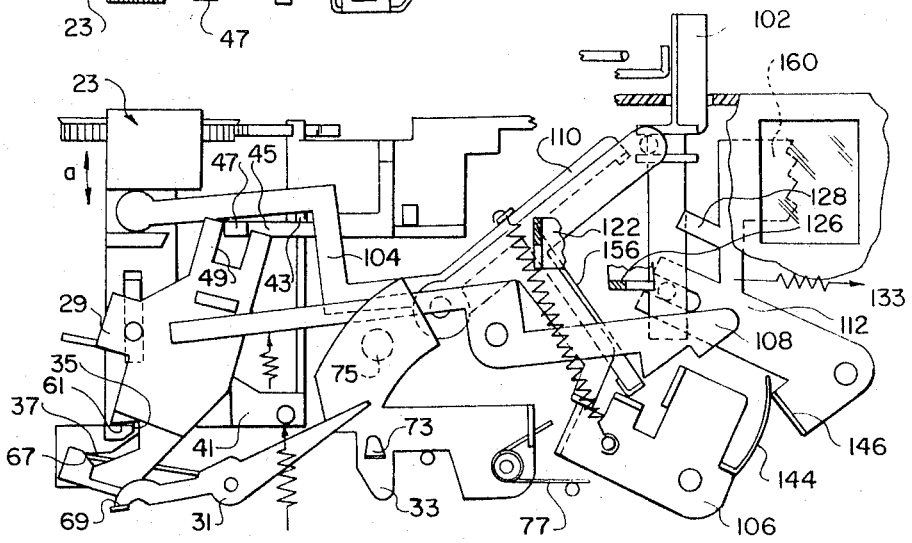
Figure 5:
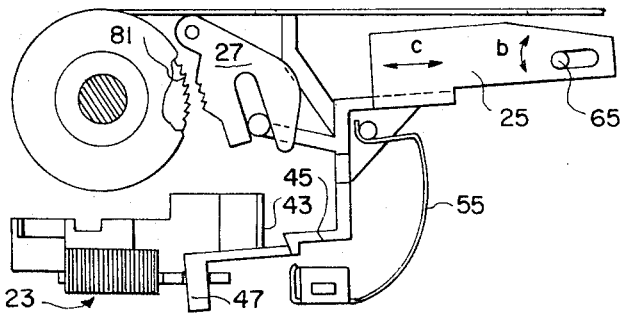
Figure 8:
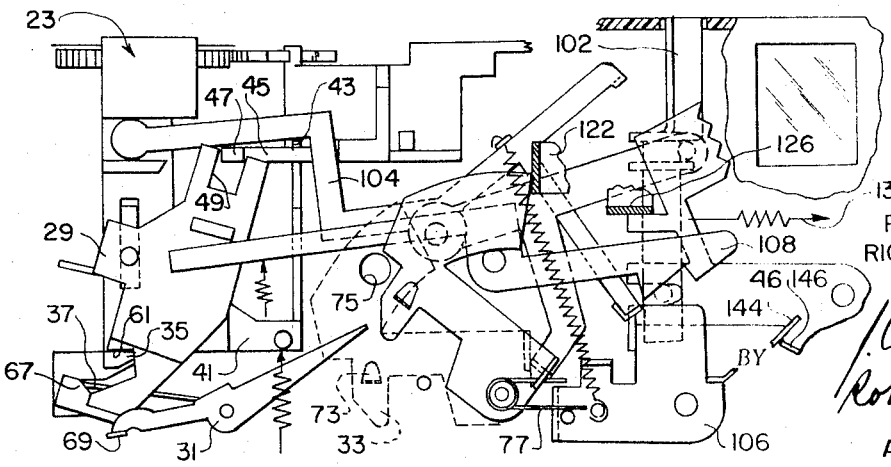

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JUNE 22, 1971

887 O.G. 1045

T887,019

PHOTOGRAPHIC APPARATUS FOR USE WITH MECHANICALLY FIREABLE FLASH STRUCTURES

Paul J. Ernisse and Richard S. Tompkins, both of 901 Elmgrove Road, Rochester, N.Y. 14650

Filed Mar. 30, 1970, Ser. No. 23,535

**Int. Cl. G03b *19/00***

U.S. Cl. 95—11L

3 Sheets Drawing. 17 Pages Specification

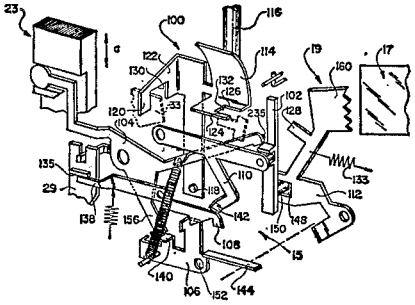

Photographic apparatus, such as a camera, for sensing the condition of and for firing a percussive flash device. The flash device includes a lamp and a striker (7) lodged in an energized position from which it is releasable to fire the lamp. The apparatus includes an actuating member (102) movable from a first position retracted from the flash device, to a second position for sensing and engaging an energized striker in the device, and to a third position for releasing the striker to fire the device. The member is moved from the first position to the second position in response to initial depression of the camera body release. Thereafter, movement from the second position to the third position and back to the first position is effected by translation of a driver from an energized condition to a released condition.

June 22, 1971 P. J. ERNISSE ET AL T887,019

PHOTOGRAPHIC APPARATUS FOR USE WITH MECHANICALLY FIREABLE FLASH STRUCTURES

Filed March 30, 1970 3 Sheets-Sheet 1

PAUL J. ERNISSE
RICHARD S. TOMPKINS
INVENTORS

BY J. Addison Walker
Robert W. Hampton

ATTORNEYS

PHOTOGRAPHIC APPARATUS FOR USE WITH MECHANICALLY FIREABLE FLASH STRUCTURES

Filed March 30, 1970 3 Sheets-Sheet 2

PAUL J. ERNISSE
RICHARD S. TOMPKINS
INVENTORS

BY J. Addison Mathews
Robert W. Hampton
ATTORNEYS

PHOTOGRAPHIC APPARATUS FOR USE WITH MECHANICALLY FIREABLE FLASH STRUCTURES

Filed March 30, 1970 3 Sheets-Sheet 3

PAUL J. ERNISSE
RICHARD S. TOMPKINS
INVENTORS
BY Addison Mathews
Robert W. Hampton
ATTORNEYS